United States Patent [19]
Blackman

[11] Patent Number: 5,263,579
[45] Date of Patent: Nov. 23, 1993

[54] CONTAINER FOR INDEX PRINT SHEET AND CASSETTE

[75] Inventor: Robert J. Blackman, Rochester, N.Y.
[73] Assignee: Eastman Kodak Company, Rochester, N.Y.
[21] Appl. No.: 3,364
[22] Filed: Jan. 12, 1993
[51] Int. Cl.[5] ............................................. B65D 85/62
[52] U.S. Cl. ................................. 206/232; 206/225; 206/389; 206/455
[58] Field of Search ............... 40/124, 124.1, 124.2, 40/124.4, 152, 152.1, 154, 156, 157, 158.1, 159, 159.2; 206/0.8, 0.81–0.84, 45.34, 216, 223, 225, 232, 333, 387, 389, 391, 409, 425, 444, 449, 450, 454–456, 457, 459.5, 461–483, 559–565, 581; 242/71, 71.1, 71.7; 281/21, 22, 26, 28, 31, 51; 434/429

[56] References Cited

U.S. PATENT DOCUMENTS

| | | | |
|---|---|---|---|
| 3,776,375 | 12/1973 | Rohdin | 206/45.34 |
| 3,865,237 | 2/1975 | Isaacs | 206/232 |
| 4,545,486 | 10/1985 | Bostic | 206/455 |
| 4,704,042 | 11/1987 | Eisen et al. | 206/455 |
| 4,892,195 | 1/1990 | Slavin et al. | 206/45.34 |
| 4,966,285 | 10/1990 | Otake et al. | 206/455 |
| 5,060,814 | 10/1991 | Oglesbee | 206/45.34 |

*Primary Examiner*—Jimmy G. Foster
*Attorney, Agent, or Firm*—Roger A. Fields

[57] ABSTRACT

A container is disclosed for a cassette holding an image bearing medium having a plurality of images recorded on it and for an index print sheet on which are printed a plurality of pictures that match the plurality of images on the image bearing medium. According to the invention, the container comprises a transparent sheet-like cover having a length and width slightly larger than corresponding dimensions of the index print sheet to closely overlay the index print sheet, and a sheet-like back having a length and width similar to the length and width of the cover to store the index print snugly between the cover and the back with the plurality of pictures on the index print sheet visible only through the cover. The back includes an integrally formed nest blown outward to hold the cassette out of the way of the index print sheet.

3 Claims, 2 Drawing Sheets

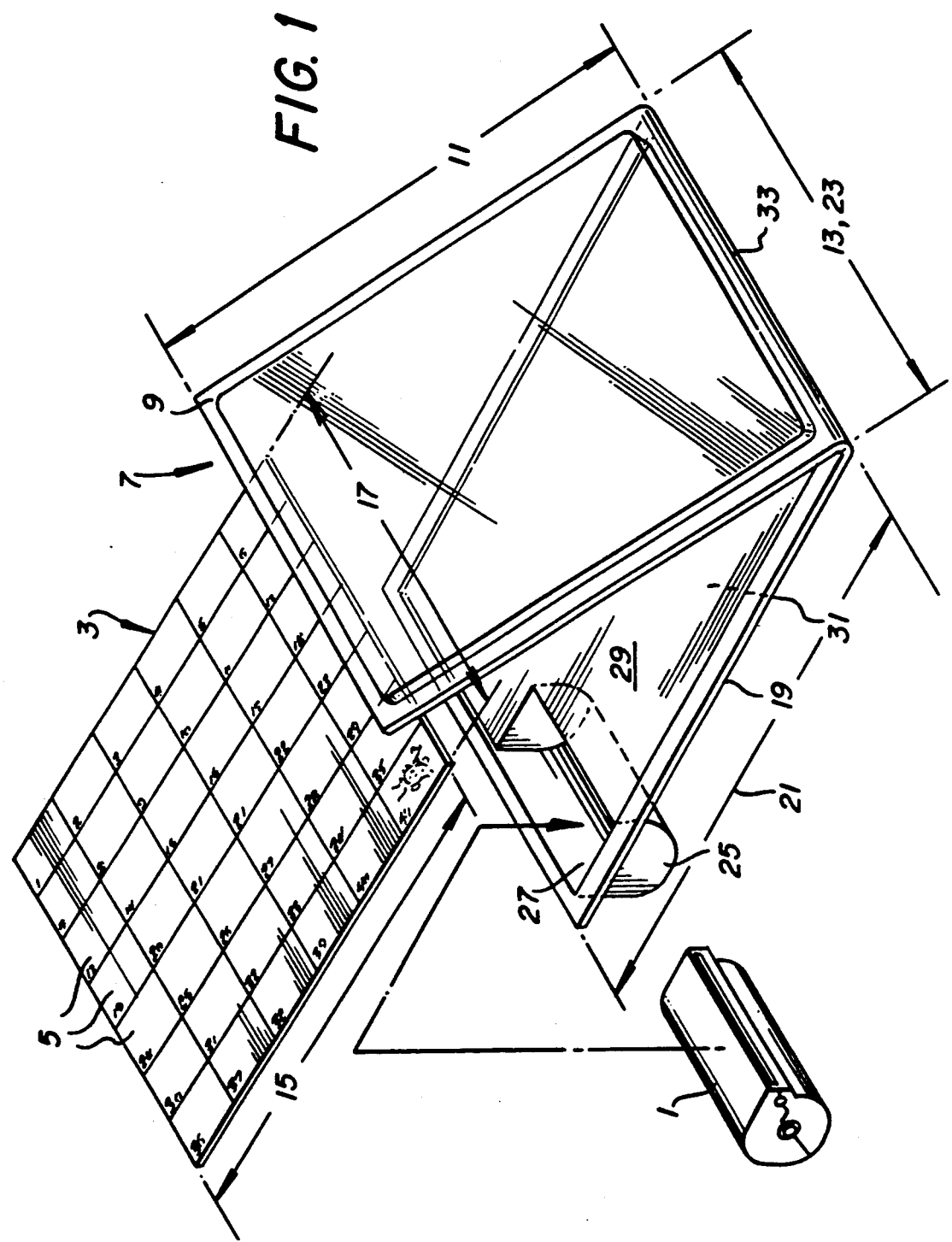

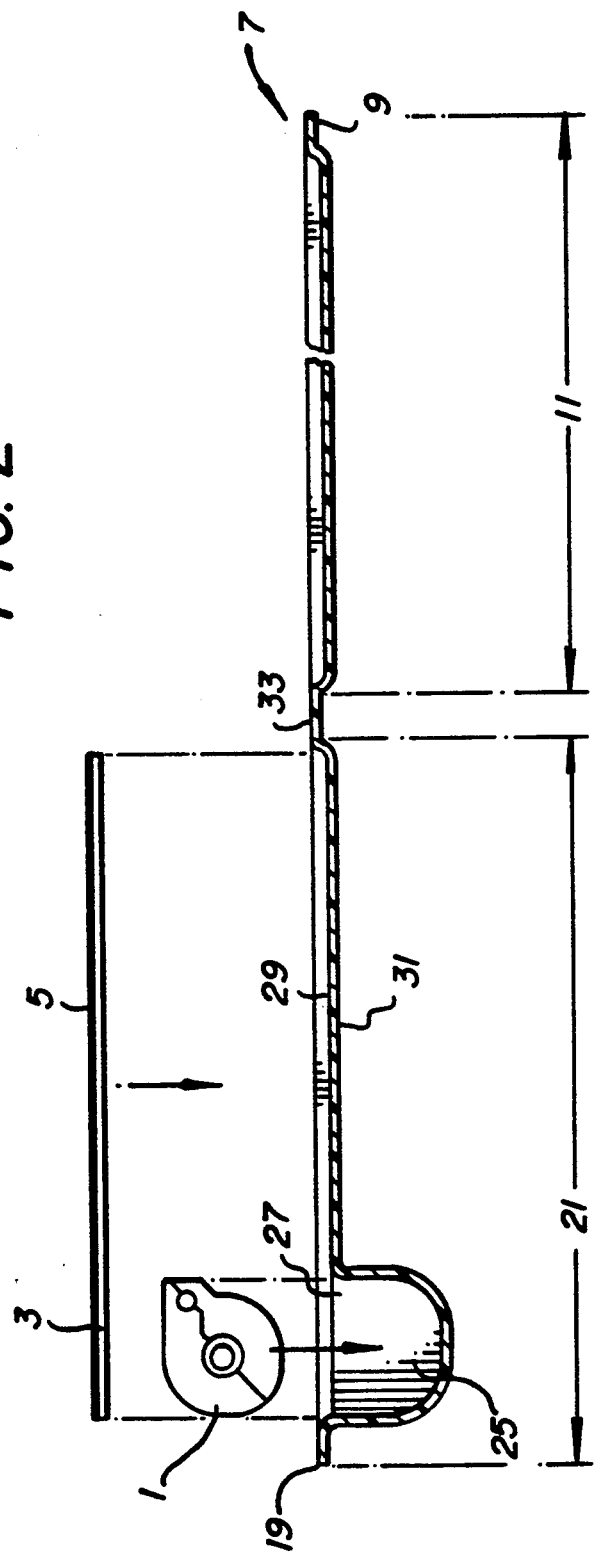

CONTAINER FOR INDEX PRINT SHEET AND CASSETTE

BACKGROUND OF THE INVENTION

1. Field of the Invention

The invention relates to a container for a cassette holding an image bearing medium having a plurality of images recorded on it and for an index print sheet on which are printed a plurality of pictures that match the plurality of images on the image bearing medium.

2. Description of the Prior Art

Generally, a processing laboratory gives the customer a processed photographic negative film and photographs which are enlarged and printed from the film. The negative film is usually cut into several sections, each one containing the same number of negatives and inserted in an open-ended sheath or sleeve. Many customers store the photographs in an envelope (with the negatives), making it difficult to later find a particular photograph.

Index or contact print sheets have been proposed which make it easier to find a particular negative. An index print sheet has printed on it several rows of pictures that match the negatives. The pictures are numbered in accordance with numbering of the negatives.

A book-like container for the index print sheet, the negatives, and individual prints is disclosed in U.S. Pat. No. 4,966,285, issued Oct. 30, 1990. The container is rather bulky and has no provision for storing a film cassette. Alternatively, the patent discloses a book-like container for an index print sheet and a still video floppy disc cassette. The index print sheet is stored in an exterior pocket formed by a transparent sheet secured along three of its edges to the respective outsides of a cover and a base of the container. Moving the cover away from the base to open the container flexes the index print sheet along a mid-line. This flexing can possibly damage the index print sheet. The cassette is stored in an interior pocket raised from the base. This arrangement makes the container rather bulky.

SUMMARY OF THE INVENTION

A container is provided for a cassette holding an image bearing medium having a plurality of images recorded on it and for an index print sheet on which are printed a plurality of pictures that match the plurality of images on the image bearing medium. According to the invention, the container comprises a transparent sheet-like cover having a length and width slightly larger than corresponding dimensions of the index print sheet to closely overlay the index print sheet, and a sheet-like back having a length and width similar to the length and width of the cover to store the index print sheet snugly between the cover and the back with the plurality of pictures on the index print sheet visible only through the cover. The back includes an integrally formed nest blown outward to hold the cassette out of the way of the index print sheet.

BRIEF DESCRIPTION OF THE DRAWINGS

FIG. 1 is a perspective view of a container according to a preferred embodiment of the invention, showing how the container is opened to receive a cassette and an index print sheet; and FIG. 2 is a sectional view of the container with the cassette and the index print sheet.

DETAILED DESCRIPTION OF THE PREFERRED EMBODIMENT

Referring to FIGS. 1 and 2, a 35 mm film cassette 1 is shown similar to the one disclosed in commonly assigned copending application Ser. No. 07/793,980 entitled FILM CASSETTE HAVING SPOOL CORE WITH FASTENING HOOK and filed Nov. 18, 1991 in the names of D. R. Zander and C. M. Csaszar. The cassette 1 holds a rolled filmstrip, not shown, having a series of successively numbered negatives.

An index print sheet 3 similar to the one disclosed in U.S. Pat. No. 4,966,285, issued Oct. 30, 1990, has a series of pictures 5 printed on it that match the negatives on the filmstrip inside the cassette 1. The pictures 5 are numbered in accordance with numbering of the negatives.

A container 7 for the cassette 1 and the index print sheet 3 consists of a single piece of transparent molded thin plastic. A sheet-like cover or lid 9 of the container 7 has a length 11 and a width 13 slightly larger than corresponding dimensions 15 and 17 of the index print sheet 3 to closely overlay the index print sheet. See FIGS. 1 and 2. A sheet-like back or base 19 of the container 7 has a length 21 and a width 23 similar to the length 11 and the width 13 of the cover 9 to store the index print sheet 3 snugly between the cover and the back with the series of pictures 5 on the index print sheet visible only through the cover. The back 19 includes an integrally formed nest or receptacle 25 having an access opening 27 at an inner side 29 of the back and projecting outward from an outer side 31 of the base to hold the cassette 1 out of the way of the index print sheet 3. A "living" hinge 33 connects the cover 9 and the back 19 to swing the cover away from the back to open and close the container 7. Known means, not shown, releasably secure the cover 9 and the back 19 to prevent the container 7 from being accidentally opened.

The invention has been described with reference to a preferred embodiment. However, it will be appreciated that variations and modifications can be effected within the ordinary skill in the art without departing from the scope of the invention.

I claim:

1. A container adapted to contain a substantially cylindrical film cassette holding a rolled filmstrip having a plurality of images recorded on it and an index print sheet on which are printed a plurality of pictures that match the plurality of images on the filmstrip, said container comprising:

a transparent sheet-like flat cover having a length and width slightly larger than corresponding dimensions of the index print sheet to closely overlay the index print sheet; and a sheet-like flat back having a length and width similar to the length and width of said cover to sandwich the index print snugly between the cover and said back with the plurality of pictures on the index print sheet visible only through the cover, and including an integrally formed nest blown outward only from the flat back in a rounded concave shape to form a pocket to snugly hold the cassette out of the way of the index print sheet.

2. A container as recited in claim 1, further comprising:

a hinge connecting said cover and said back to swing one away from the other to insert the cassette into said nest and the index print sheet between the cover and the back.

3. An assemblage of a substantially cylindrical film cassette holding a rolled filmstrip having a plurality of images recorded on it, an index print sheet on which are printed a plurality of pictures that match the plurality of images on the filmstrip, and a container containing the film cassette and the index print sheet, said container comprising:

a transparent flat lid closely overlaying the index print sheet with the plurality of pictures on the index point sheet visible only through said lid; and a flat base closely overlaying the index print, and including an integrally formed nest having an access opening at an inner side of the base and projecting outward in a rounded concave shape only from an outer side of the base to form a pocket which snugly holds the cassette out of the way of the index print sheet.

* * * * *